US008599981B2

(12) United States Patent
Oshikiri

(10) Patent No.: US 8,599,981 B2
(45) Date of Patent: Dec. 3, 2013

(54) POST-FILTER, DECODING DEVICE, AND POST-FILTER PROCESSING METHOD

(75) Inventor: Masahiro Oshikiri, Kanagawa (JP)

(73) Assignee: Panasonic Corporation, Osaka (JP)

( * ) Notice: Subject to any disclaimer, the term of this patent is extended or adjusted under 35 U.S.C. 154(b) by 466 days.

(21) Appl. No.: 12/529,212

(22) PCT Filed: Feb. 29, 2008

(86) PCT No.: PCT/JP2008/000399

§ 371 (c)(1), (2), (4) Date: Aug. 31, 2009

(87) PCT Pub. No.: WO2008/120438

PCT Pub. Date: Oct. 9, 2008

(65) Prior Publication Data

US 2010/0098199 A1 Apr. 22, 2010

(30) Foreign Application Priority Data

Mar. 2, 2007 (JP) ................................ 2007-053528

(51) Int. Cl.
*H04B 1/10* (2006.01)

(52) U.S. Cl.
USPC ............................ 375/350; 375/346; 375/316

(58) Field of Classification Search
USPC ................................................ 375/316–352
See application file for complete search history.

(56) References Cited

U.S. PATENT DOCUMENTS 4,617,676 A * 10/1986 Jayant et al. .................. 375/241
5,884,251 A 3/1999 Kim et al.
6,584,441 B1 6/2003 Ojala et al.
2002/0107686 A1 8/2002 Unno
2004/0228535 A1 * 11/2004 Honda et al. .................. 382/233
2005/0163323 A1 7/2005 Oshikiri (Continued)

FOREIGN PATENT DOCUMENTS

JP 10-55199 2/1998
JP 2002-501225 1/2002

(Continued)

OTHER PUBLICATIONS

English language Abstract of JP 10-55199, Feb. 24, 1998.

(Continued)

*Primary Examiner* — Sam K Ahn
*Assistant Examiner* — Janice Tieu
(74) *Attorney, Agent, or Firm* — Greenblum & Bernstein, P.L.C.

(57) ABSTRACT

Provided is a decoding device which suppresses generation of an abnormal sound caused by a layer switch. The decoding device includes: a first layer decoding unit (202) which performs a decoding process on first layer encoded data so as to generate a first layer decoding signal; a second layer decoding unit (203) which performs a decoding process on second layer encoded data so as to generate a first layer decoding error signal; an adder (204) which adds the first layer decoding signal and the first layer decoding error signal so as to generate a second layer decoding signal; a switching unit (205) which performs switching between the first layer signal and the second layer decoding signal for output according to layer information; and a post-filter (206) which selects a control parameter corresponding to the respective layer information and performs a control parameter smoothing process so as to generate a smoothed control parameter and performs a filter process on the decoding signal from the switching unit (205) by using the generated smoothed control parameter.

20 Claims, 15 Drawing Sheets

(56) References Cited

U.S. PATENT DOCUMENTS

| | | | | |
|---|---|---|---|---|
| 2006/0173677 | A1 | 8/2006 | Sato et al. | |
| 2007/0223577 | A1 | 9/2007 | Ehara et al. | |
| 2007/0233467 | A1 | 10/2007 | Oshikiri | |
| 2007/0271101 | A1 | 11/2007 | Sato et al. | |
| 2008/0002482 | A1* | 1/2008 | Kang | 365/189.09 |
| 2008/0255833 | A1 | 10/2008 | Goto et al. | |
| 2009/0018824 | A1 | 1/2009 | Teo | |
| 2009/0061785 | A1 | 3/2009 | Kawashima et al. | |
| 2009/0306992 | A1 | 12/2009 | Ragot et al. | |

FOREIGN PATENT DOCUMENTS

| | | |
|---|---|---|
| JP | 2004-102186 | 4/2004 |
| WO | 99/38155 | 7/1999 |
| WO | 2005/106850 | 11/2005 |
| WO | 2005/112005 | 11/2005 |
| WO | 2006/098274 | 9/2006 |
| WO | 2007/010158 | 1/2007 |

OTHER PUBLICATIONS

English language Abstract of JP 2004-102186, Apr. 2, 2004.

English language Abstract of JP 2002-501225, Jan. 15, 2002.

"All about MPEG-4," written and edited by Sukeichi Miki, the first edition, Kogyo Chosakai Publishing, Inc., Sep. 30, 1998, pp. 126-127.

Juin-Hwey Chen et al., "Adaptive postfiltering for quality enhancement of coded speech," IEEE Trans. Speech and Audio Processing, vol. SAP-3, pp. 59-71, 1995.

U.S. Appl. No. 12/528,878 to Ehara, which was filed on Aug. 27, 2009.

U.S. Appl. No. 12/528,661 to Sato et al, which was filed on Aug. 26, 2009.

U.S. Appl. No. 12/528,671 to Kawashima et al, which was filed on Aug. 26, 2009.

U.S. Appl. No. 12/528,869 to Oshikiri et al, which was filed on Aug. 27, 2009.

U.S. Appl. No. 12/528,877 to Morii et al, which was filed on Aug. 27, 2009.

U.S. Appl. No. 12/529,219 to Morii et al, which was filed on Aug. 31, 2009.

U.S. Appl. No. 12/528,871 to Morii et al, which was filed on Aug. 27, 2009.

U.S. Appl. No. 12/528,659 to Oshikiri et al, which was filed on Aug. 26, 2009.

U.S. Appl. No. 12/528,880 to Ehara, which was filed on Aug. 27, 2009.

* cited by examiner

| LAYER INFORMATION | SPEECH QUALITY | DEGREE OF NOISE SUPPRESSION BY POST FILTER | EXAMPLE OF CONTROL PARAMETERS |
|---|---|---|---|
| 1 (FIRST LAYER) | BASIC QUALITY | HIGH | $(\gamma_{n\_set}, \gamma_{d\_set}, \mu_{set}) = (0.5, 0.8, 0.5)$ |
| 2 (SECOND LAYER) | IMPROVED QUALITY | LOW (OR ZERO) | $(\gamma_{n\_set}, \gamma_{d\_set}, \mu_{set}) = (0.0, 0.0, 0.0)$ |

FIG.3

POST-FILTER, DECODING DEVICE, AND POST-FILTER PROCESSING METHOD

TECHNICAL FIELD

The present invention relates to a post filter, decoding apparatus and post filtering processing method for suppressing quantization noise of spectra of decoded signals that are acquired by decoding encoded code to which a scalable coding scheme is applied.

BACKGROUND ART

It is demanded in a mobile communication system that speech signals are compressed to low bit rates to transmit to efficiently utilize radio wave resources and so on. On the other hand, it is also demanded that quality improvement in telephone call speech and call service of high fidelity be realized, and, to meet these demands, it is preferable to not only provide high quality speech signals but also encode high quality audio signals of wider bands and other high quality signals than speech signals.

The technique of integrating a plurality of coding techniques in layers is promising for these two contradictory demands. This technique combines in layers the first layer for encoding input signals in a form adequate for speech signals at low bit rates and a second layer for encoding differential signals between input signals and decoded signals of the first layer in a form adequate to other signals than speech. The technique of performing layered coding in this way have characteristics of providing scalability in bit streams acquired from an encoding apparatus, that is, acquiring decoded signals from part of information of bit streams, and, therefore, is generally referred to as "scalable coding (layered coding)."

The scalable coding scheme can flexibly support communication between networks of varying bit rates thanks to its characteristics, and, consequently, is adequate for a future network environment where various networks will be integrated by the IP protocol.

For example, Non-Patent Document 1 discloses a technique of realizing scalable coding using the technique that is standardized by MPEG-4 (Moving Picture Experts Group phase-4). This technique uses CELP (Code Excited Linear Prediction) coding adequate to speech signals, in the first layer, and uses transform coding such as AAC (Advanced Audio Coder) and TwinVQ (Transform Domain Weighted Interleave Vector Quantization) with respect to residual signals subtracting first layer decoded signals from original signals, in the second layer.

By the way, a post filter is known as an effective technique for improving speech quality of decoded speech signals. Generally, although, when speech signals are encoded at a low bit rate, quantization noise in the portions of spectral valleys of decoded signals is perceived, quantization noise in such portions of spectral valleys can be suppressed by applying a post filter. As a result, noise of decoded signals is reduced and the subjective quality is improved. A typical post filter transfer function PF(z) is represented by following equation 1 using a formant emphasis filter F(z) and spectral tilt correction filter U(z) (see Non-Patent Document 2).

[1]

$$PF(z) = F(z)\cdot U(z) \quad \text{(Equation 1)}$$

[2]

$$F(z) = \frac{1-\sum_{i=1}^{NP}\alpha(i)\gamma_n^i z^{-i}}{1-\sum_{i=1}^{NP}\alpha(i)\gamma_d^i z^{-i}} \quad \text{(Equation 2)}$$

[3]

$$U(z) = 1-\mu\cdot z^{-1} \quad \text{(Equation 3)}$$

Here, α(i) is the LPC (Linear Prediction Coding) coefficients of a decoded signal, NP is the order of the LPC coefficients, $\gamma_n$ and $\gamma_d$ ($0<\gamma_n<\gamma_d<1$) are control parameters for determining the degree of noise suppression by a post filter, and μ is a control parameter for correcting the spectral tilt produced by a formant emphasis filter. Further, the degree of noise suppression by the post filter is determined based on the relationship between the control parameters, and, when the difference between the control parameters $\gamma_d$ and $\gamma_n$ is greater, the degree of noise suppression (i.e. the degree of spectral modification) is greater and, when the difference between the control parameter $\gamma_d$ and $\gamma_n$ is smaller, the degree of noise suppression (i.e. the degree of spectral modification) is smaller.

Meanwhile, Patent Document 1 discloses a method of selecting one of a plurality of control parameters prepared in advance according to an average bit rate calculated based on a predetermined time length and applying this control parameter to the post filter, in variable bit rate speech coding for changing the bit rate in an encoding section on a per frame basis according to the characteristics of input signals.

Patent Document 1: Japanese Translation of PCT Application Laid-Open No. 2002-501225

Non-Patent Document 1: "All about MPEG-4," written and edited by Sukeichi MIKI, the first edition, Kogyo Chosakai Publishing, Inc., Sep. 30, 1998, page 126 to 127

Non-Patent Document 2: "Adaptive postfiltering for quality enhancement of coded speech," J.-H. Chen and A. Gersho, IEEE Trans. Speech and Audio Processing, vol. SAP-3, pp. 59-71, 1995.

DISCLOSURE OF INVENTION

Problems to be Solved by the Invention

However, the above post filter disclosed in Non-Patent Document 2 performs post filtering processing using predetermined control parameters at all times and, therefore, can only be adapted to one of the first layer decoded signal and the second layer decoded signal. Therefore, there is a problem that, when a decoded signal of a layer to which the post filter is not adapted is applied to the post filter, speech quality decreases due to layer switching.

Further, the above post filter disclosed in Patent Document 1 selects one of a plurality of predetermined control parameters that are prepared, according to the average bit rate calculated based on a predetermined time length and uses this control parameter to improve the quality of the variable bit rate coding scheme. In case where predetermined control parameters are prepared such that post filter characteristics change greatly, post filter characteristics change greatly when the control parameter to be selected changes between adjacent frames. As a result, there are cases where an output signal becomes discontinuous in a frame connecting portion and degraded sound is produced.

Further, like the problem in Non-Patent Document 2, in case where the values of predetermined control parameters are set such that the post filter characteristics become similar, it is difficult to adapt the post filter to both first layer decoded signals and second layer decoded signals. As a result, the post filter cannot provide the effect of improving subjective quality very much, and there is a problem of causing deterioration in subjective quality.

It is therefore an object of the present invention to provide a post filter, decoding apparatus and post filtering processing method for, in a scalable coding scheme, preventing occurrence of degraded sound caused by layer switching.

Means for Solving the Problem

The post filter according to the present invention that suppresses quantization noise of a decoded signal which is subjected to layer coding by a coding scheme comprised of a plurality of layers, includes: a control parameter selecting section that, based on layer information showing layers included in the signal subjected to layer coding, selects a control parameter corresponding to layer information; a smoothing section that, when the control parameter selected by the control parameter selecting section switches, sets the control parameter such that the control parameter before the switch changes gradually to the control parameter after the switch; and a first filtering processing section that performs filtering processing with respect to the decoded signal using the control parameter set in the smoothing section.

The decoding apparatus according to the present invention that decodes a signal which is subjected to layer coding by a coding scheme comprised of a plurality of layers, includes: a first layer decoding section that performs decoding processing with respect to first layer encoded data to generate a first layer decoded signal; a second layer decoding section that performs decoding processing with respect to second layer encoded data to generate a first layer decoded error signal; an adding section that adds the first layer decoded signal and the first layer decoded error signal to generate a second layer decoded signal; a switching section that, based on layer information showing layers included in the signal subjected to layer coding, switches and outputs the first layer decoded signal and the second layer decoded signal; and a post filter section that performs filtering processing with respect to the decoded signal received from the switching section, and the post filter section has: a control parameter selecting section that, based on the layer information showing the layers included in the signal subjected to layer coding, selects a control parameter corresponding to layer information; a smoothing section that, when the control parameter selected by the control parameter selecting section switches, sets the control parameter such that the control parameter before the switch changes gradually to the control parameter after the switch; and a filtering processing section that performs filtering processing with respect to the decoded signal using the control parameter set in the smoothing section.

The post filtering processing method according to the present invention of suppressing quantization noise of a decoded signal which is subjected to layer coding by a coding scheme comprised of a plurality of layers, includes: a step of, based on layer information showing layers included in the signal subjected to layer coding, selects a control parameter corresponding to layer information; a step of, when the control parameter selected in the step of selecting the control parameter, setting the control parameter such that the control parameter before the switch changes gradually to the control parameter after the switch; and a step of performing filtering processing with respect to the decoded signal using the set control parameter.

Advantageous Effects of Invention

The present invention makes it possible to set the level of a post filter so as to match the quality of decoded signals of each layer and prevent occurrence of degraded sound even when layer switching takes place, by performing smoothing processing of control parameters of the post filter, using the smoothed control parameters and performing filtering processing.

BRIEF DESCRIPTION OF DRAWINGS

FIG. 3 is a table showing the relationship between layer information and control parameters of a post filter according to Embodiment 1 of the present invention;

BEST MODE FOR CARRYING OUT THE INVENTION

Embodiment 1

Hereinafter, embodiments of the present invention will be explained in detail with reference to the accompanying drawings.

Figure 1:
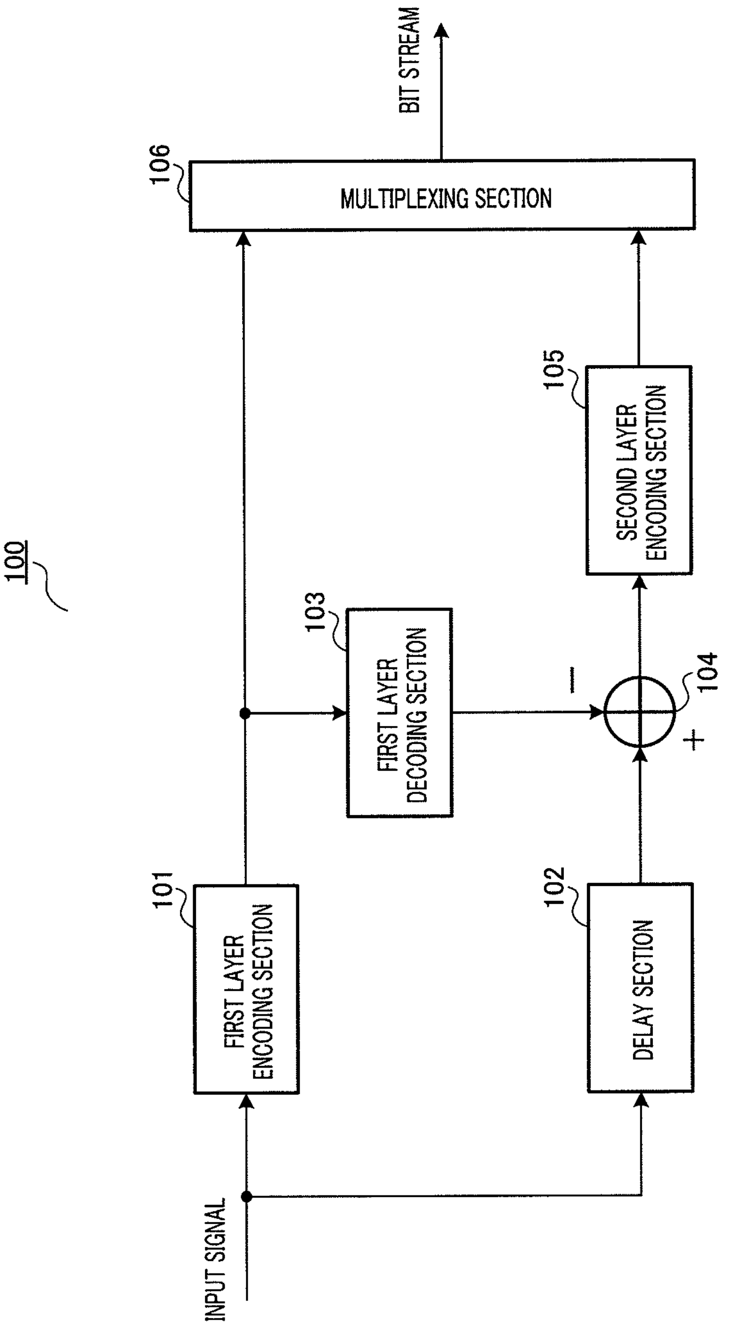
FIG. 1 is a block diagram showing the main configuration of an encoding apparatus that transmits encoded data to a decoding apparatus according to Embodiment 1 of the present invention.

FIG. 1 is a block diagram showing the configuration of an encoding apparatus that transmits encoded data to a decoding apparatus according to Embodiment 1 of the present invention. Encoding apparatus 100 shown in FIG. 1 has first layer encoding section 101, delay section 102, first layer decoding section 103, subtracting section 104, second layer encoding section 105 and multiplexing section 106.

First layer encoding section 101 performs encoding processing with respect to an input signal to generate first layer encoded data, and outputs this first layer encoded data to multiplexing section 106 and first layer decoding section 103.

Delay section 102 applies a delay of a predetermined duration to the input signal, and outputs the input signal to subtracting section 104. This delay is used to correct the delay time produced in first layer encoding section 101 and first layer decoding section 103.

First layer decoding section 103 performs decoding processing with respect to the first layer encoded data to generate a first layer decoded signal, and outputs the first layer decoded signal to subtracting section 104.

Subtracting section 104 subtracts the first layer decoded signal from the input signal which is delayed by a predetermined duration and which is outputted from delay section 102, to generate the first layer error signal, and outputs the first layer error signal to second layer encoding section 105.

Second layer encoding section 105 performs encoding processing of the first layer error signal received from subtracting section 104, and outputs the generated encoded data to multiplexing section 106.

Multiplexing section 106 multiplexes the first layer encoded data generated in first layer encoding section 101 and the second layer encoded data generated in second layer encoding section 105, and outputs the resulting bit stream (i.e. signal subjected to layer coding) to the transmission channel.

Figure 2:
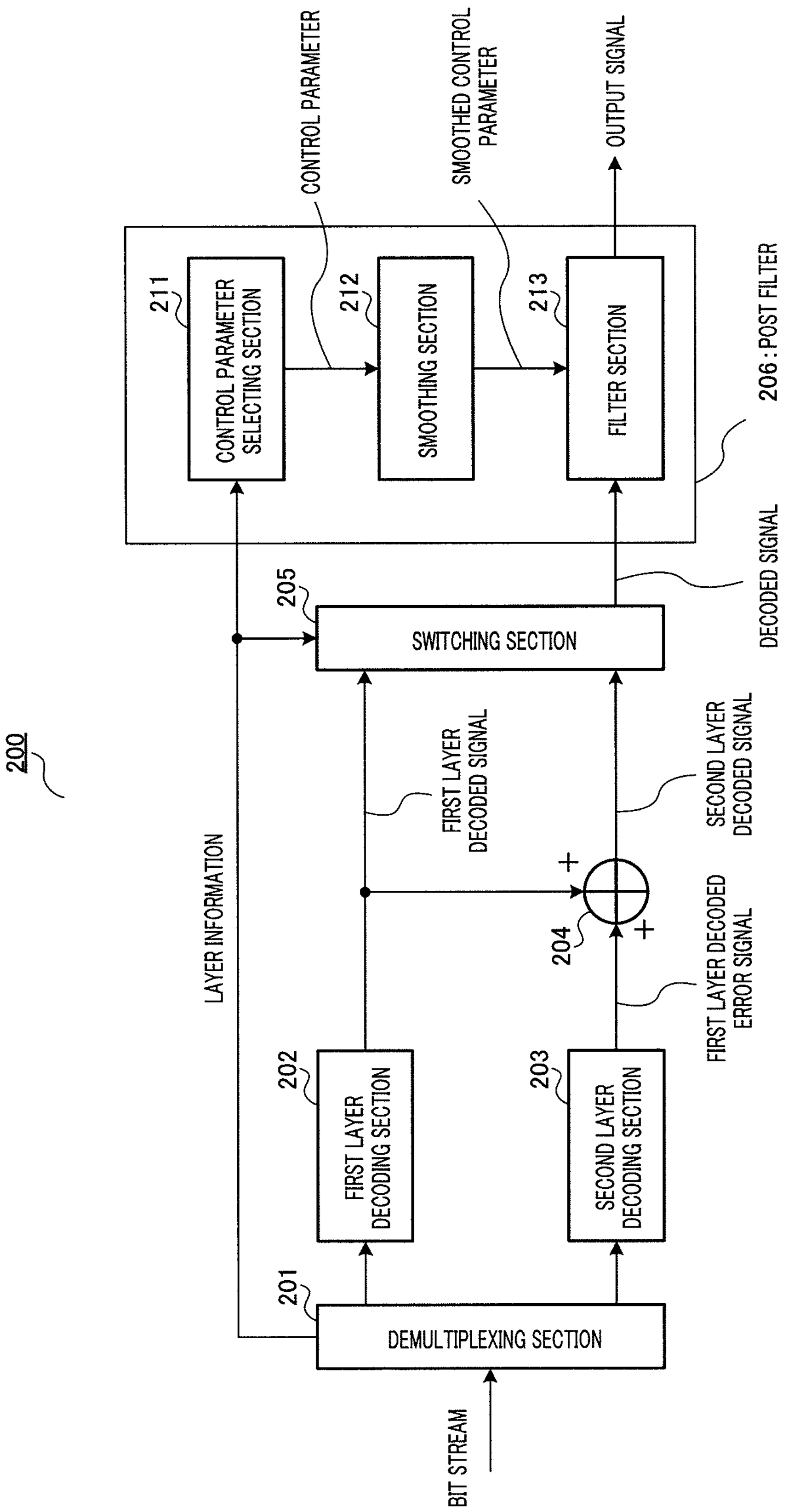
FIG. 2 is a block diagram showing the main configuration of the decoding apparatus according to Embodiment 1 of the present invention.

FIG. 2 is a block diagram showing the configuration of the decoding apparatus according to Embodiment 1 of the present invention. Decoding apparatus 200 shown in FIG. 2 has demultiplexing section 201, first layer decoding section 202, second layer decoding section 203, adding section 204, switching section 205 and post filter 206. Post filter 206 is constituted mainly by control parameter selecting section 211, smoothing section 212 and filter section 213.

Demultiplexing section 201 receives the bit stream (i.e. signal subjected to layer coding) outputted from encoding apparatus 100, demultiplexes the bit stream to the first layer encoded data and second layer encoded data, and outputs the first layer encoded data and second layer encoded data to first layer decoding section 202 and second layer decoding section 203, respectively. Further, when both first layer encoded data and second layer encoded data are included in an input bit stream, demultiplexing section 201 outputs "2" as layer information, to switching section 205 and post filter 206. By contrast with this, when only first layer encoded data is included in an input bit stream, demultiplexing section 201 outputs "1" as layer information, to switching section 205 and post filter 206. Meanwhile, although there are cases where all encoded data is discarded, in these cases, the decoding section of each layer performs predetermined error compensation processing, and the post filter performs processing assuming that information layer shows "1." The present embodiment will be explained assuming that the decoding apparatus acquires either all encoded data or encoded data from which second layer encoded data is discarded.

First layer decoding section 202 performs decoding processing with respect to the first layer encoded data to generate a first layer decoded signal, and outputs the first layer decoded signal to switching section 205 and adding section 204. The speech quality of first layer decoded signal is lower than a second layer decoded signal (described later), and, in the following explanation, this speech quality will be referred to as "basic quality" for ease of explanation.

When the second layer encoded data is received from demultiplexing section 201, second layer decoding section 203 performs decoding processing using second layer encoded data to generate a first layer decoded error signal, and outputs this first layer decoded error signal to adding section 204.

Adding section 204 adds the first layer decoded signal and first layer decoded error signal to generate a second layer decoded signal, and outputs the second layer decoded signal to switching section 205. The speech quality of this second layer decoded signal is higher than the speech quality of the above-described first layer decoded signal and, in the following explanation, this speech quality will be referred to as "improved quality" for ease of explanation.

Switching section 205 switches a decoded signal to output, based on layer information from demultiplexing section 201.

To be more specific, switching section 205 outputs the first layer decoded signal as the decoded signal, to post filter 206 when layer information shows "1," and outputs the second layer decoded signal as the decoded signal, to post filter 206 when layer information shows "2."

Post filter 206 selects a control parameter based on the layer information, finds a smoothed control parameter using this control parameter and performs filtering processing of the decoded signal using this smoothed control parameter to generate and output an output signal.

Control parameter selecting section 211 selects one of a plurality of control parameters that are prepared in advance, based on the layer information, and outputs this control parameter to smoothing section 212. When layer information shows "1," the speech quality of a decoded signal is at the level of basic quality, and therefore the degree of quantization noise suppression needs to be made greater and, for example, $\gamma_{n\_set}=0.5$, $\gamma_{d\_set}=0.8$, and $\mu_{set}=0.5$, are used for the control parameters. By contrast with this, when layer information shows "2," the speech quality of a decoded signal is improved quality, and therefore the degree of quantization noise suppression is preferably small (or zero) and, for example, $\gamma_{n\_set}=0.0$, $\gamma_{d\_set}=0.0$, and $\mu_{set}=0.0$ are used for the control parameters. In this case, PF(z)=1 holds, and the spectrum of a decoded signal is not modified. This is because, in case where speech quality of a decoded signal is sufficiently high (that is, when layer information shows "2"), if the decoded signal is applied to the post filter, the spectrum is modified and the speech quality is deteriorated by contrast. To avoid this, when layer information shows "2," control parameters are selected as described above. However, if the filter state is not updated, there are cases where the output signal becomes discontinuous between frames and degraded sound is produced, and therefore processing is performed using the value of the above control parameter to update the filter state of the post filter. FIG. 3 shows the above-described relationship between layer information and control parameters of the post filter.

Smoothing section 212 performs smoothing processing of the control parameter selected in control parameter selecting section 211, and outputs the control parameter after smoothing processing (hereinafter, referred to as "smoothed control parameter") to filter section 213. Smoothing refers to processing of setting a control parameter such that, when layer information switches from "1" to "2" or "2" to "1," the control parameter selected by control parameter selecting section 211 changes gradually from the parameter before the switch to the parameter after the switch. Smoothing section 212 calculates each control parameter according to equations 4, 5 and 6.

[4]

$$\gamma_n = x \cdot \gamma_{n\_set} + (1.0 - x) \cdot \gamma_{n\_p} \quad \text{(Equation 4)}$$

[5]

$$\gamma_d = x \cdot \gamma_{d\_set} + (1.0 - x) \cdot \gamma_{d\_p} \quad \text{(Equation 5)}$$

[6]

$$\mu = x \cdot \mu_{set} + (1.0 - x) \cdot \mu_p \quad \text{(Equation 6)}$$

Here, x is the smoothing coefficient that assumes a value equal to or greater than 0 and less than 1, $\gamma_n$, $\gamma_d$, and $\mu$ are the smoothed control parameters outputted from smoothing section 212, $\gamma_{n\_set}$, $\gamma_{d\_set}$ and $\mu_{set}$ are control parameters acquired in control parameter selecting section 211 and $\gamma_{n\_p}$, $\gamma_{d\_p}$ and $\mu_p$ are buffers used for smoothing. Smoothing section 212 outputs the smoothed control parameters and then updates the buffers as in following equations 7, 8 and 9.

[7]

$$\gamma_{n\_p} = \gamma_n \quad \text{(Equation 7)}$$

[8]

$$\gamma_{d\_p} \gamma_d \quad \text{(Equation 8)}$$

[9]

$$\mu_p = \mu \quad \text{(Equation 9)}$$

Further, it is preferable to use the layer 1 control parameter or layer 2 control parameter stored in control parameter selecting section 211 for the default value of the buffers.

The smoothed control parameters and buffers are calculated and updated, respectively, at predetermined time intervals. For example, frames provide the processing unit in decoding processing in the decoding section, or a plurality of subframes acquired by dividing a frame, may be used as a predetermined time interval. Further, processing may be performed in sample units. However, when the time interval is made shorter, the amount of calculation becomes greater, and, consequently, at what time intervals the smoothed control parameters are calculated and the buffers are updated need to be designed taking into account the trade-off between the effect of the present invention and the amount of calculation.

Figure 4:
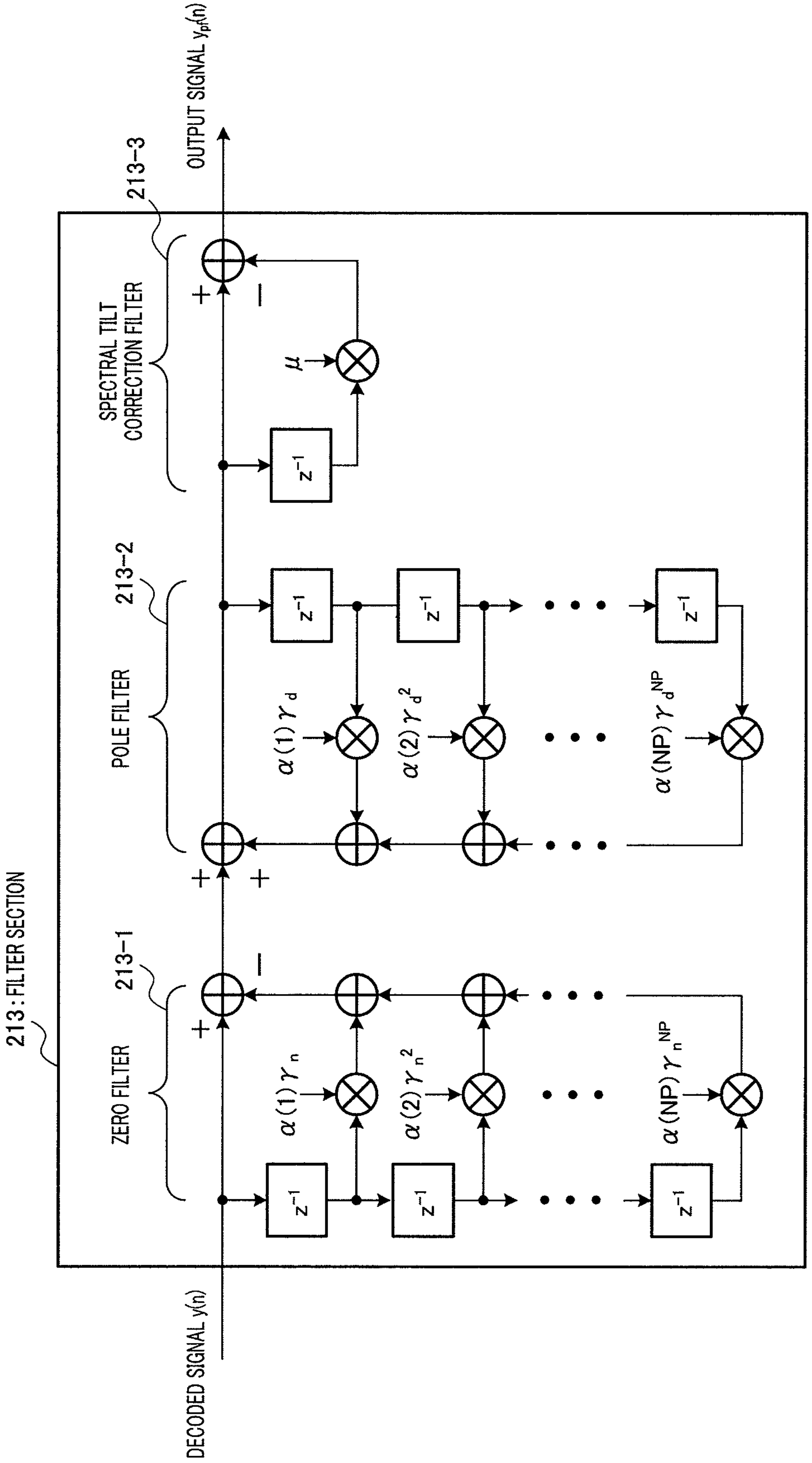
FIG. 4 shows the configuration of a filter section of the decoding apparatus according to Embodiment 1 of the present invention.

Filter section 213 performs filtering processing with respect to the decoded signal received from switching section 205 using the smoothed control parameter received from smoothing section 212. FIG. 4 is a block diagram showing the main configuration of filter section 213. Filter section 213 has zero filter 213-1 and pole filter 213-2 of formant emphasis filter PF(z), spectral tilt correction filter 213-3.

Zero filter 213-1 performs filtering according to following equation 10.

[10]

$$y_1(n) = y(n) - \sum_{i=1}^{NP} \alpha(i) \cdot \gamma_n^i \cdot y(n-i) \quad \text{(Equation 10)}$$

Here, y(n) is the decoded signal, $y_1(n)$ is the output signal of the zero filter, $\alpha(i)$ is the LPC coefficients and $\gamma_n$ is the smoothed control parameter (i.e. zero filter) outputted from smoothing section 212. The LPC coefficients $\alpha(i)$ assumes the LPC coefficients that are acquired as a by-product of decoding processing in first layer decoding section 202 or second layer decoding section 203. Further, it may be possible to use the LPC coefficients that are acquired by performing an LPC analysis of a decoded signal.

Pole filter 213-2 performs filtering according to following equation 11.

[11]

$$y_2(n) = y_1(n) + \sum_{i=1}^{NP} \alpha(i) \cdot \gamma_d^i \cdot y_2(n-i) \quad \text{(Equation 11)}$$

Here, $y_2(n)$ is the output signal of the pole filter, and $\gamma_d$ is the smoothed control parameter (i.e. pole filter) outputted from smoothing section 212.

Spectral tilt correction filter 213-3 performs filtering according to following equation 12.

$$y_{pf}(n) = y_2(n) - \mu \cdot y_2(n-1) \quad \text{(Equation 12)}$$

Here, $y_{pf}(n)$ is the output signal, and $\mu$ is the smoothed control parameter (i.e. spectral tilt correction filter).

Figures 5A, 5B, 5C, 5D:
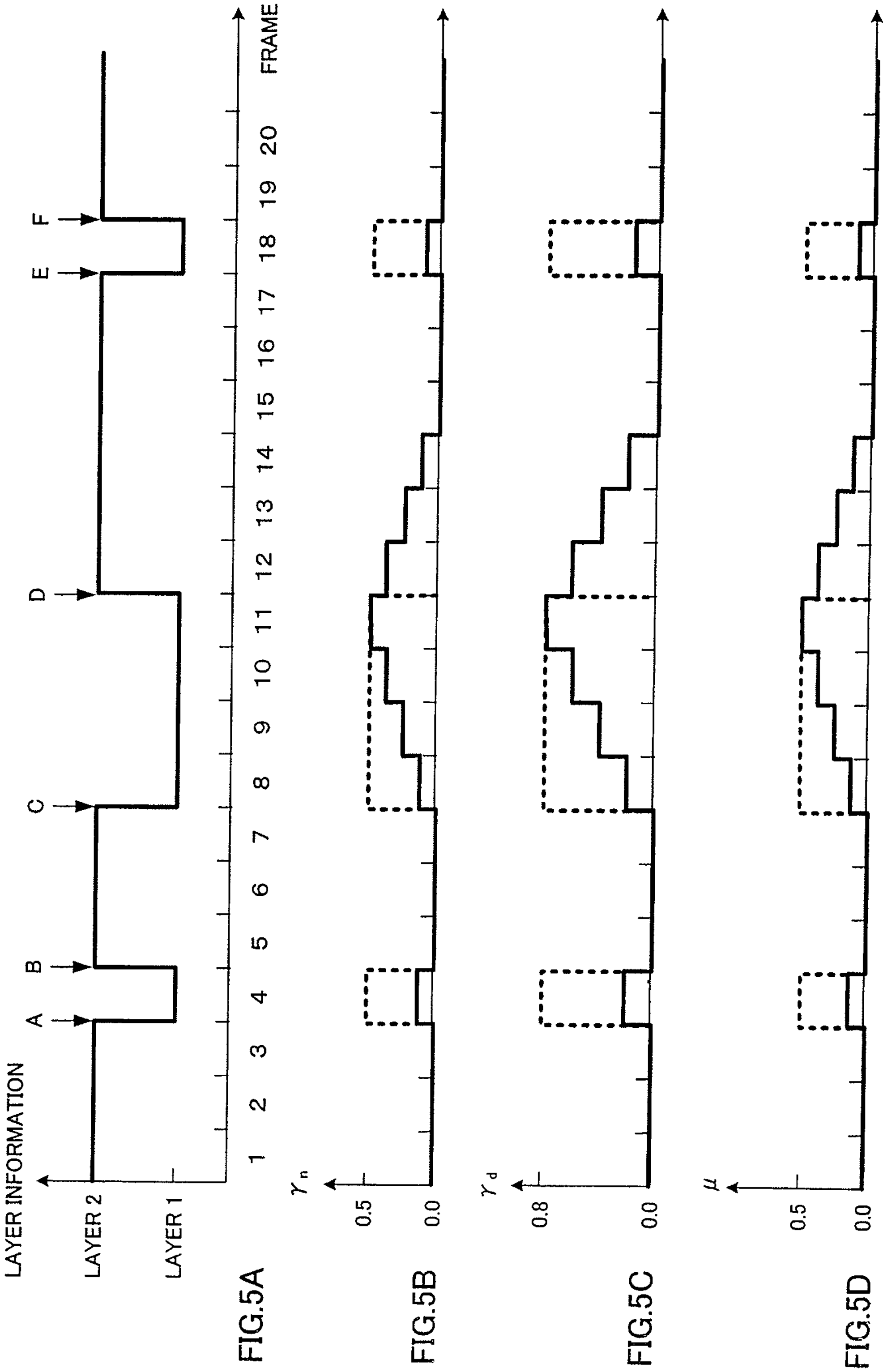
FIG. 5A shows how layer information fluctuates in the time domain (i.e. frame number) according to Embodiment 1 of the present invention.
FIG. 5B shows how a control parameter outputted from a zero filter changes according to Embodiment 1 of the present invention.
FIG. 5C shows how a control parameter outputted from a pole filter changes according to Embodiment 1 of the present invention.
FIG. 5D shows how a control parameter outputted from a spectral tilt correction filter changes according to Embodiment 1 of the present invention.

FIG. 5A shows how layer information fluctuates in the time domain (i.e. frame number), and layer switching takes place at points A to F. FIG. 5B shows how the control parameter of the zero filter changes, FIG. 5C shows how the control parameter of the pole filter changes and FIG. 5D shows how the control parameter of the spectral tilt correction filter changes. FIG. 5B, FIG. 5C and FIG. 5D show the smoothed control parameter by the solid line, and shows the control parameter by the dotted line in case where smoothing is not performed.

As is clear from FIG. 5B, FIG. 5C and FIG. 5D, in case where smoothing is not performed, the control parameter changes greatly when layer switching takes place. In this way, the post filter characteristics change greatly between adjacent frames, and the output signal becomes discontinuous in the boundaries of consecutive frames. This discontinuity is perceived as degraded sound, causing deterioration in speech quality. Therefore, by performing smoothing, the control parameter changes gradually even when layer switching takes place, so that the change in the post filter characteristics becomes moderate and the output signal does not become discontinuous in the boundaries of consecutive frames.

In this way, the present embodiment makes it possible to prevent occurrence of degraded sound due to layer switching by performing smoothing in the scalable coding scheme. Furthermore, when the same layer is selected successively, the smoothed control parameter becomes the same as the control parameter adapted to the selected layer in a comparatively short period, so that it is possible to realize improvement in speech quality thanks to the fundamental effect of the post filter.

Still further, although the methods as in equations 4, 5 and 6 are used as the method of smoothing control parameters, the present invention is not limited to this method, and the essential requirement is that the control parameter before the switch changes smoothly to the control parameter after the switch when layer switching takes place. For example, there may be a method of making a linear change and a method of utilizing the function for performing smoothing like the spline function.

Figure 6:
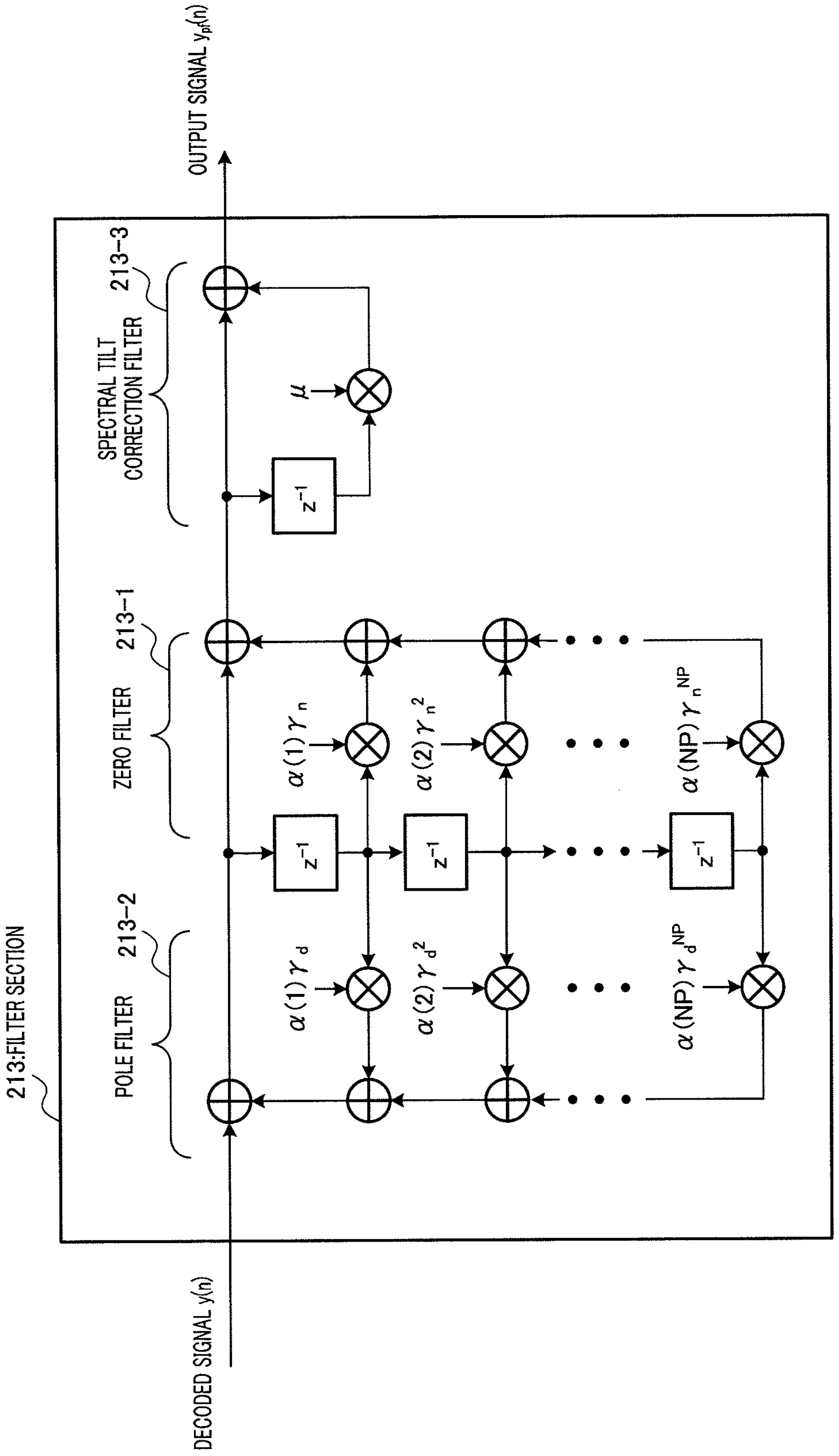
FIG. 6 shows another aspect of the configuration of the filter section of the decoding apparatus according to Embodiment 1 of the present invention.

Further, although the configuration of the post filter has been explained in order from the zero filter, pole filter and spectral tilt correction filter as shown in FIG. 4, the present invention is not limited to this, and the configuration of the post filter may be in order from the pole filter and zero filter as shown in FIG. 6. FIG. 6 shows another aspect of the configuration of the filter section according to the present embodiment. In this case, the filter state of the pole filter and the filter state of the zero filter can be shared, and the amount of memory can be reduced.

Further, an example has been explained where, when layer information shows "2," $\gamma_{n\_set}$=0.0, $\gamma_{d\_set}$=0.0 and $\mu_{set}$=0.0 are used for control parameters to realize the post filter that does not modify the spectra of decoded signals in FIG. 5 (hereinafter, a post filter that does not modify the spectra of decoded signals, will be referred to as "non-modifying post filter"). The present invention is not limited to this, and the average value of control parameters of the pole filter and zero filter of the other layer using the post filter which modifies spectra, or a value similar to this average value may be assigned to control parameters of the pole filter and zero filter of a layer using a non-modifying post filter. Explanation will be made with reference to FIG. 7.

Figures 7A, 7B, 7C, 7D:
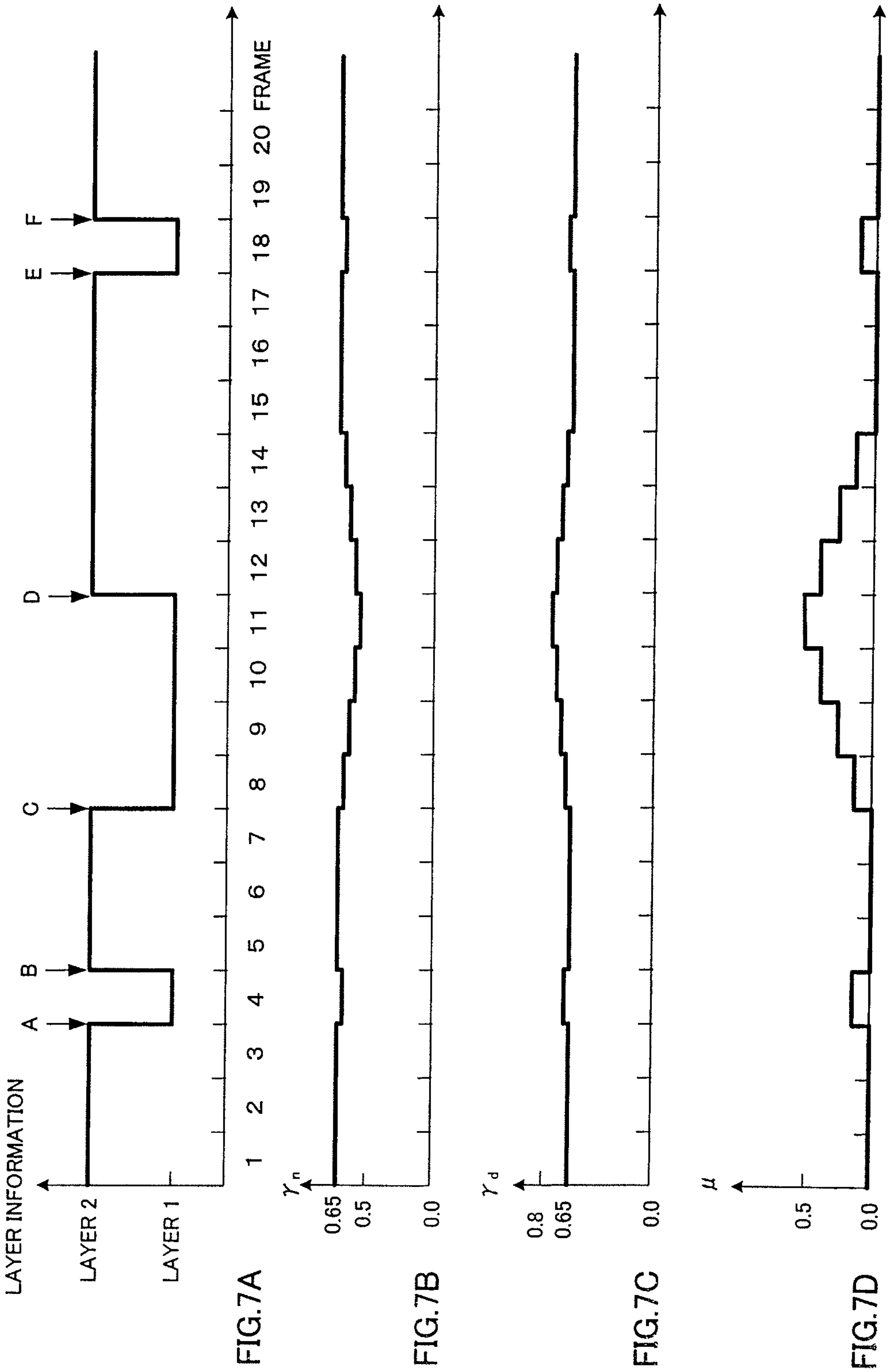
FIG. 7A shows how layer information fluctuates in the time domain (i.e. frame number) according to Embodiment 1 of the present invention.
FIG. 7B shows how a control parameter outputted from the zero filter changes according to Embodiment 1 of the present invention.
FIG. 7C shows how a control parameter outputted from the pole filter changes according to Embodiment 1 of the present invention.
FIG. 7D shows how a control parameter outputted from the spectral tilt correction filter changes according to Embodiment 1 of the present invention.
Figure 8A:
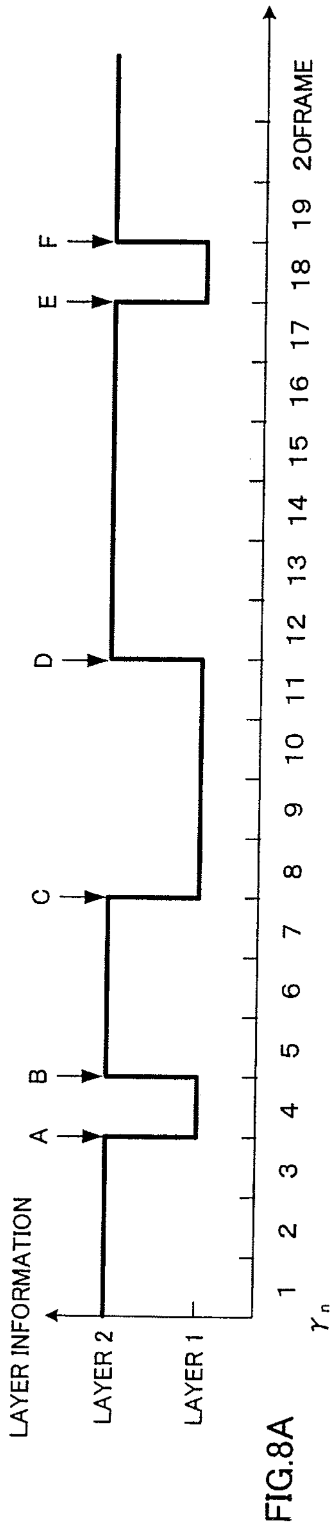
FIG. 8A shows how layer information fluctuates in the time domain (i.e. frame number) according to Embodiment 1 of the present invention.
Figure 8B:
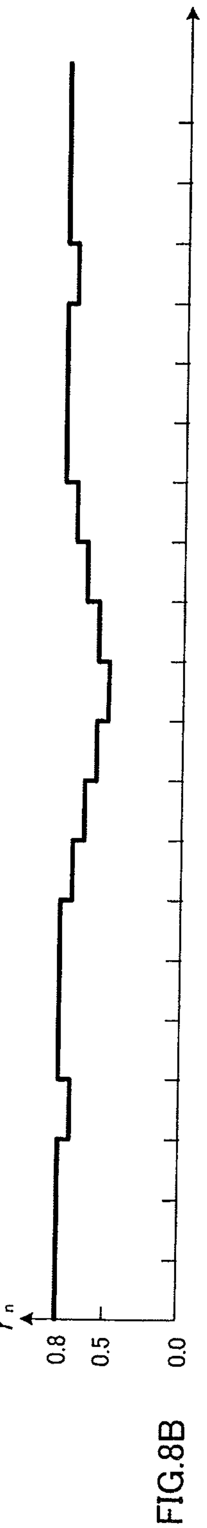
FIG. 8B shows how a control parameter of the zero filter changes according to Embodiment 1 of the present invention.
Figure 8C:
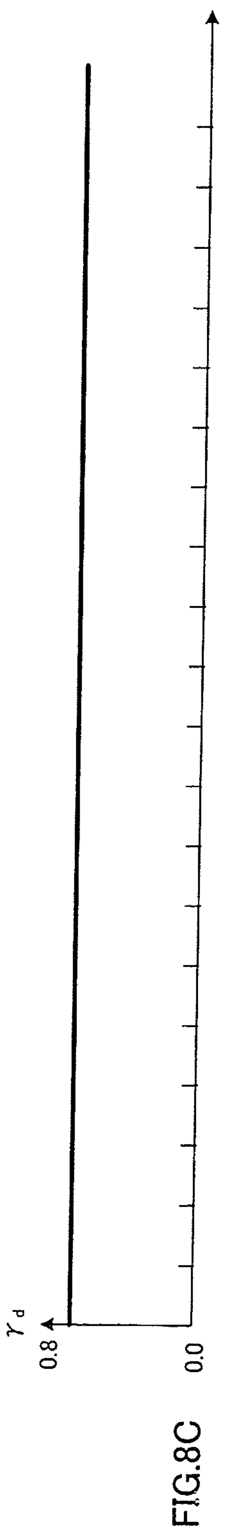
FIG. 8C shows how a control parameter of the pole filter changes according to Embodiment 1 of the present invention.
Figure 8D:
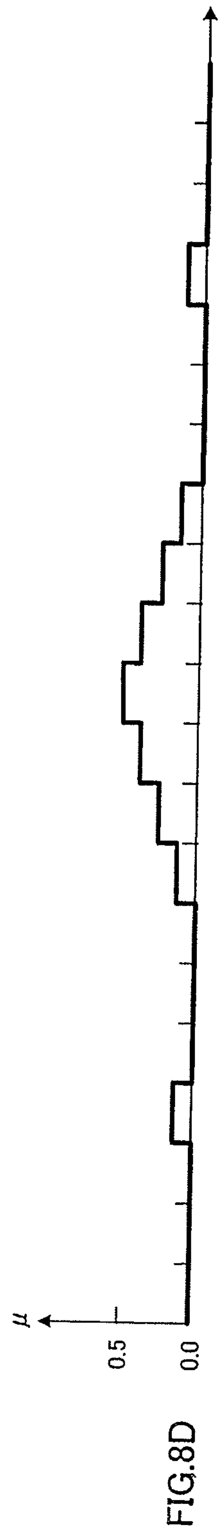
FIG. 8D shows how a control parameter from the spectral tilt correction filter changes according to Embodiment 1 of the present invention.
Figures 9A, 9B, 9C, 9D:
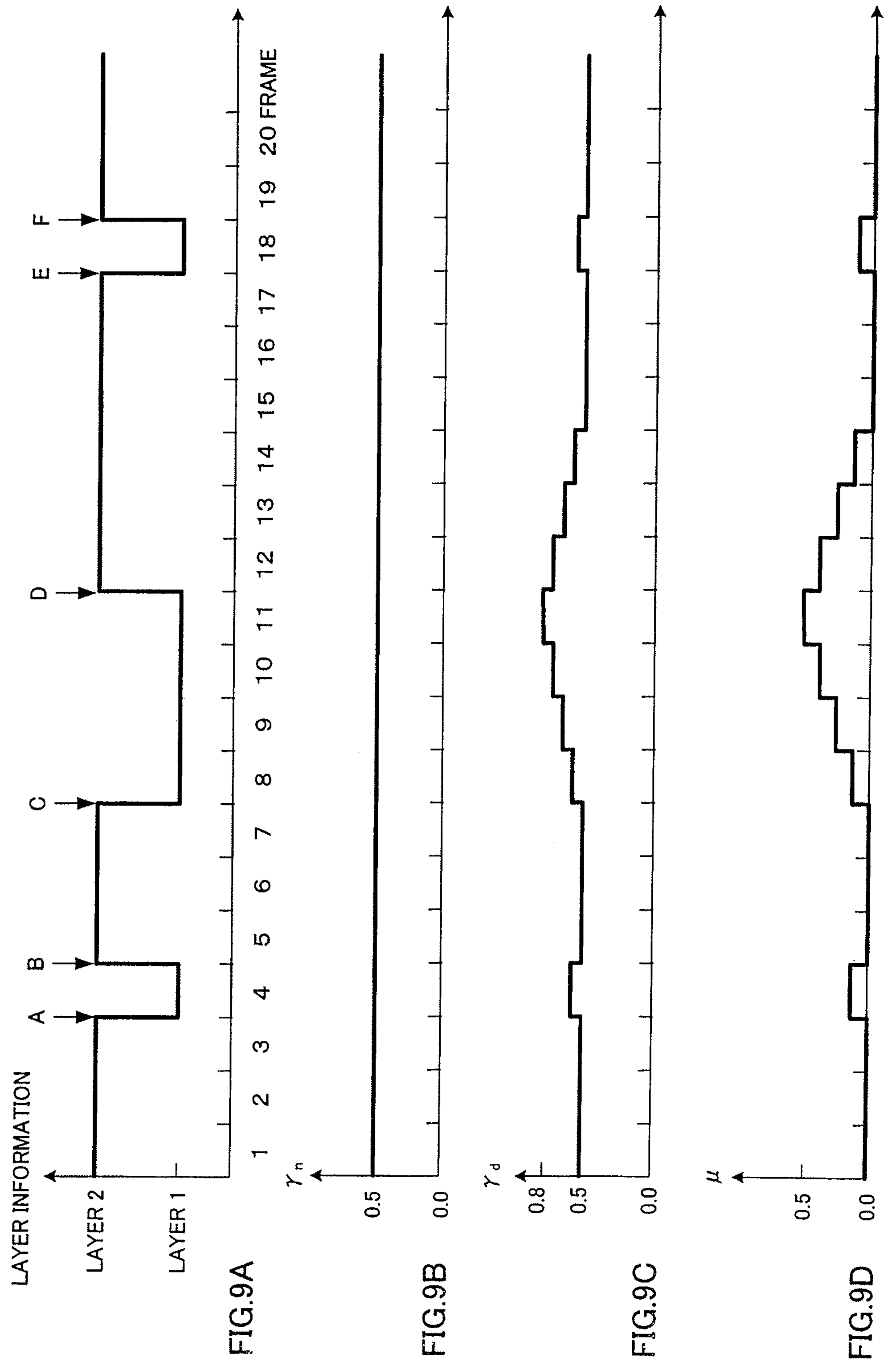
FIG. 9A shows how layer information fluctuates in the time domain (i.e. frame number) according to Embodiment 1 of the present invention.
FIG. 9B shows how a control parameter outputted from the zero filter changes according to Embodiment 1 of the present invention.
FIG. 9C shows how a control parameter outputted from the pole filter changes according to Embodiment 1 of the present invention.
FIG. 9D shows how a smoothed control parameter outputted from the spectral tilt correction filter changes according to Embodiment 1 of the present invention.

FIG. 7A shows how layer information fluctuates in the time domain (i.e. frame number), and layer switching takes place at points A to F. FIG. 7B shows how the smoothed control parameter is changed by the zero filter in case where the average value is assigned to the control parameter $\gamma_{n\_set}$ when layer information shows "2," FIG. 7C shows how the smoothed control parameter is changed by the pole filter in case where the average value is assigned to the control parameter $\gamma_{d\_set}$ when layer information shows "2," and FIG. 7D shows how the smoothed control parameter is changed by the spectral tilt correction filter in case where 0.0 is assigned to the control parameter $\mu_{set}$ when layer information shows "2."

To be more specific, the control parameters $\gamma_{n\_set}$ and $\gamma_{d\_set}$ of the zero filter and pole filter of the layer (layer 2) using the non-modifying post filter is set in advance to 0.65, the average value of the control parameters of the zero filter and pole filter of the other layer (layer 1) using the post filter which modifies spectra. In this way, PF(z)=1 holds, that is, $\gamma_{n\_set}$ and $\gamma_{d\_set}$ are made the same value and $\mu_{set}$ is made 0.0, so that spectral characteristics of the zero filter and pole filter become completely opposite and cancel each other, and, consequently, it is possible to realize a non-modifying post filter.

Moreover, the possible range of the smoothed control parameter $\gamma_n$ of the zero filter is $0.0 \le \gamma_n \le 0.5$ with the example of FIG. 5, and is limited to $0.5 \le \gamma_n \le 0.65$ with the example of FIG. 7. Moreover, the possible range of the smoothed control parameter $\gamma_d$ of the pole filter is $0.0 \le \gamma_d \le 0.8$ with the example of FIG. 5, and is limited to $0.65 \le \gamma_d \le 0.8$ with the example of FIG. 7. In this way, changes in the smoothed control parameters of the zero filter and pole filter in case where layer switching takes place, become moderate compared to the cases of FIG. 5B and FIG. 5C. Consequently, it is possible to avoid the phenomenon where output signals become discontinuous in boundaries of consecutive frames, and further prevent occurrence of degraded sound. Further, by utilizing this effect, it may be possible to set a greater value to the smoothing coefficient x and make changes in smoothed control parameters faster. In this case, when layer switching takes place, control parameters adapted to a given layer can switch to control parameters adapted to another layer in a shorter period, so that it is possible to realize speech quality improvement.

A case has been explained above where control parameters of the pole filter and zero filter of one layer using the non-modifying post filter, are assigned the average value of control parameters of the pole filter and zero filter of the other layer using the post filter which modifies spectra, or a value similar to the average value. The present invention is not limited to this, and the essential requirement is that the control parameters of the pole filter and zero filter of the layer using the non-post filter are set to be included in the range of the control parameters of the pole filter and zero filter of the layer using the post filter which modifies spectra. For example, with the above example, when the control parameters $\gamma_{n\_set}$ and $\gamma_{d\_set}$ of the pole filter and zero filter using the non-modifying post filter, assume the value ($0.5 \le \gamma_{n\_set}$, $\gamma_{d\_set} \le 0.8$) included in the range between 0.5 and 0.8, it is possible to provide the same effect.

Further, a configuration may be possible where one of the smoothed control parameter of the zero filter and the smoothed control parameter of the pole filter is fluctuated. FIG. 8A, FIG. 8B, FIG. 8C and FIG. 8D show such a case. In this case, the control parameter of the pole filter is shared between layer 1 and layer 2 and the control parameter of the zero filter is changed when layer switching takes place. In this case, control parameters of the layer (layer 2) using the non-modifying post filter use $\gamma_{n\_set}=\gamma_{d\_set}$=0.8. With such a configuration, the control parameter of the pole filter needs not to be smoothed, so that it is possible to reduce the amount of calculation. Similarly, the control parameters of the zero filters may be shared between layer 1 and layer 2, and the control parameter of the pole filter may be changed when layer switching takes place. FIG. 9A, FIG. 9B, FIG. 9C and FIG. 9 show such a case. In this case, it is also possible to acquire the same effect.

Further, the present invention is applicable to the configurations including the three or more layers. This will be explained below using a specific example. For example, assume that, in the configuration including three layers, the control parameters of zero filters and pole filters of layer 1 and layer 2 are set as follows. $(\gamma_n, \gamma_d)=(0.5, 0.8)$ holds in layer 1, and $(\gamma_n, \gamma_d)=(0.8, 0.9)$ holds in layer 2.

Then, assuming that the non-modifying post filter is used in layer 3, control parameters of layer 3 are set to values included in the range (0.5 to 0.9) of control parameters of pole filters and zero filters of layer 1 and layer 2. If these values assume an average value, $\gamma_n=\gamma_d=(0.5+0.8+0.8+0.9)/4=0.75$ is used. By setting control parameters of the non-modifying post filter in this way, even when layer switching takes place between layer 1 and layer 3, between layer 2 and layer 3 or between layer 1 and layer 2, smoothed control parameters of zero filters and pole filters change moderately. In addition, if it is possible to predict the probability which one of layer 1 and layer 2 is selected, an average may be calculated by performing weighting according to this probability. To be more specific, control parameters of the non-modifying post filter are set by applying a greater weight to control parameters of a layer that is more likely to be selected and applying a smaller weight to control parameters of a layer that is less likely to be selected.

Embodiment 2

Figure 10:
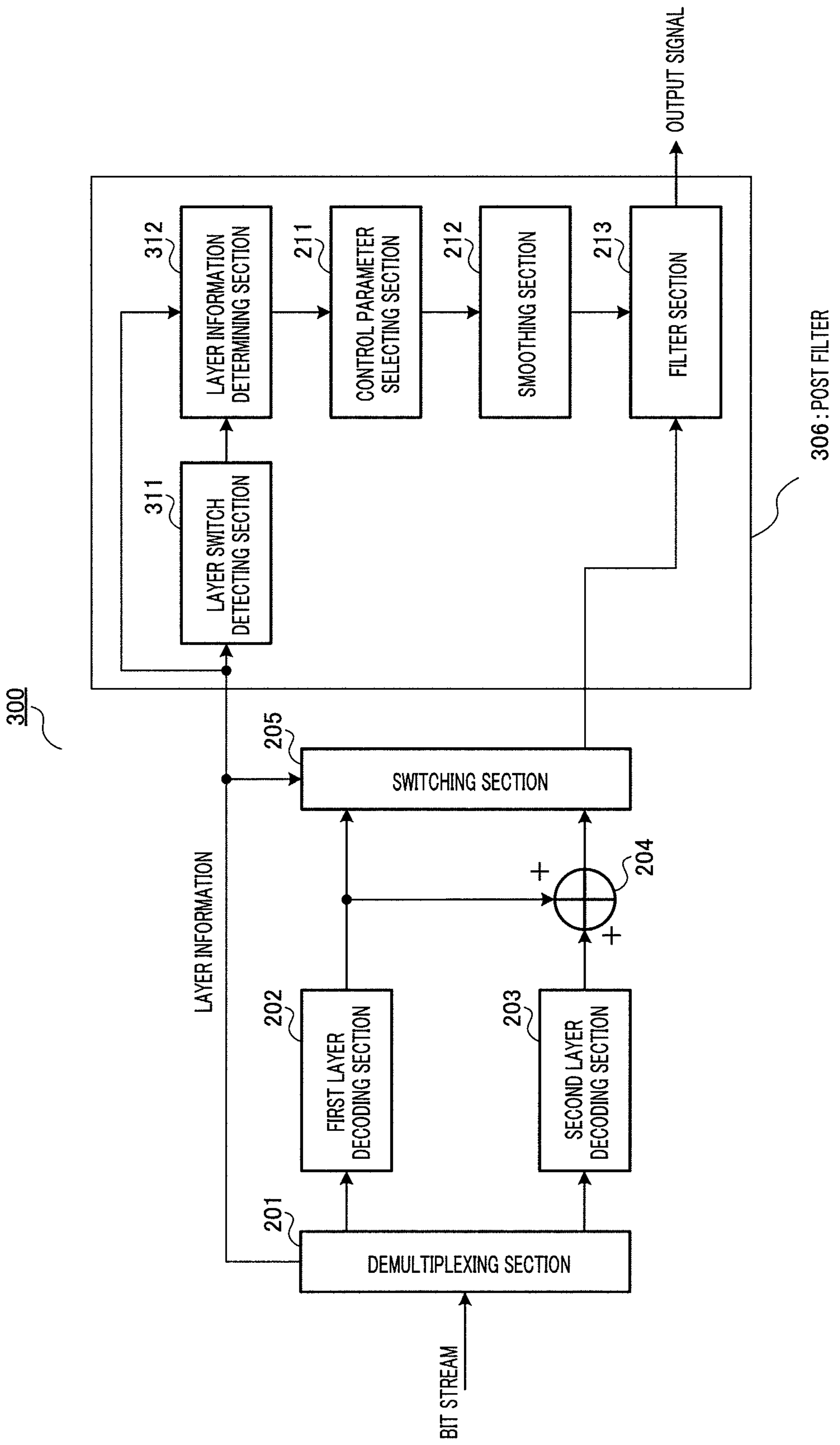
FIG. 10 is a block diagram showing the main configuration of the decoding apparatus according to Embodiment 2 of the present invention.

FIG. 10 is a block diagram showing the main configuration of the decoding apparatus according to Embodiment 2 of the present invention. Further, decoding apparatus 300 shown in FIG. 10 has the same basic configuration as decoding apparatus 200 shown in FIG. 2, and the same components will be assigned the same reference numerals and explanation thereof will be omitted.

The configuration inside post filter 306 of decoding apparatus 300 shown in FIG. 10 differs from the post filter of decoding apparatus 200 shown in FIG. 2, and post filter 306 employs a configuration with additions of layer switch detecting section 311 and layer information determining section 312.

Layer switch detecting section 311 detects whether or not layer switching takes place by comparing layer information of the current frame received from demultiplexing section 201 and layer information of an earlier frame stored in the buffer. To be more specific, layer switch detecting section 311 detects that layer switching takes place when layer information of the current frame and layer information of an earlier frame are different, and makes detection information "1" to output to layer information determining section 312. Further, layer switch detecting section 311 detects that layer switching does not take place when layer information of the current frame and layer information of an earlier frame are the same, and makes detection information "0" to output to layer information determining section 312. Further, layer switch detecting section 311 updates layer information stored in the buffer, to layer information of the current frame.

When detection information received from layer switch detecting section 311 shows "1," that is, when layer switching is detected, layer information determining section 312 decides whether or not the layer switching interval is within a predetermined number of frames (this number is represented as "$N_{HO}$"). Then, when deciding that the layer switching interval is within a predetermined number of frames, layer information determining section 312 replaces current layer information received from demultiplexing section 201, with earlier layer information stored in the buffer and outputs the result to control parameter selecting section 211. Further, when replacement of layer information is executed in a predetermined number of frames, layer information determining section 312 updates layer information stored in the buffer, to layer information inputted upon replacement of layer information.

Figures 11A, 11B, 11C, 11D:
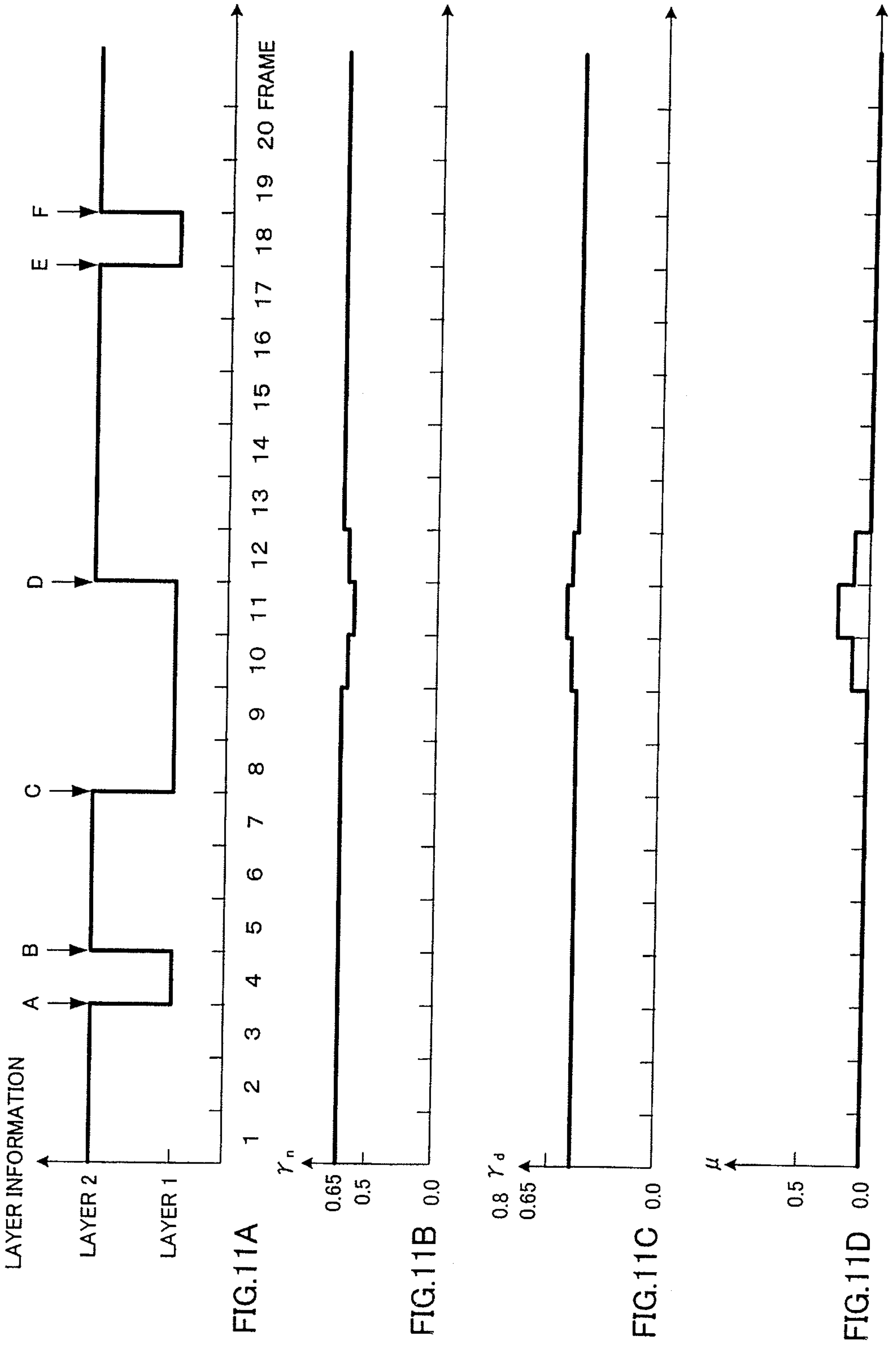
FIG. 11A shows how layer information fluctuates in the time domain (i.e. frame number) according to Embodiment 2 of the present invention.
FIG. 11B shows how a control parameter of the zero filter changes according to Embodiment 2 of the present invention.
FIG. 11C shows how a control parameter of the pole filter changes according to Embodiment 2 of the present invention.
FIG. 11D shows how a control parameter of the spectral tilt correction filter changes according to Embodiment 2 of the present invention.

FIG. 11A shows how layer information fluctuates in the time domain (i.e. frame number), and layer switching takes place at points A to F. FIG. 11B, FIG. 11C and FIG. 11D show how smoothed control parameters are changed by the zero filter, pole filter and spectral tilt correction filter in case where $N_{HO}=2$ holds.

In FIG. 11, with respect to frames where the layer switching interval is a predetermined number ($N_{HO}$ is equal to or less than 2), that is, frame 4 and frame 18, layer information determining section 312 replaces layer information of frame 4 and frame 18, with layer information before layer switching takes place, and therefore the smoothed control parameter does not change.

In this way, even when layer switching takes place at shorter intervals, the present embodiment can suppress frequent changes in control parameters by skipping layer switching that takes place within a predetermined number of frames, so that it is possible to perform post filtering processing stably and further prevent occurrence of degraded sound.

Embodiment 3

Figure 12:
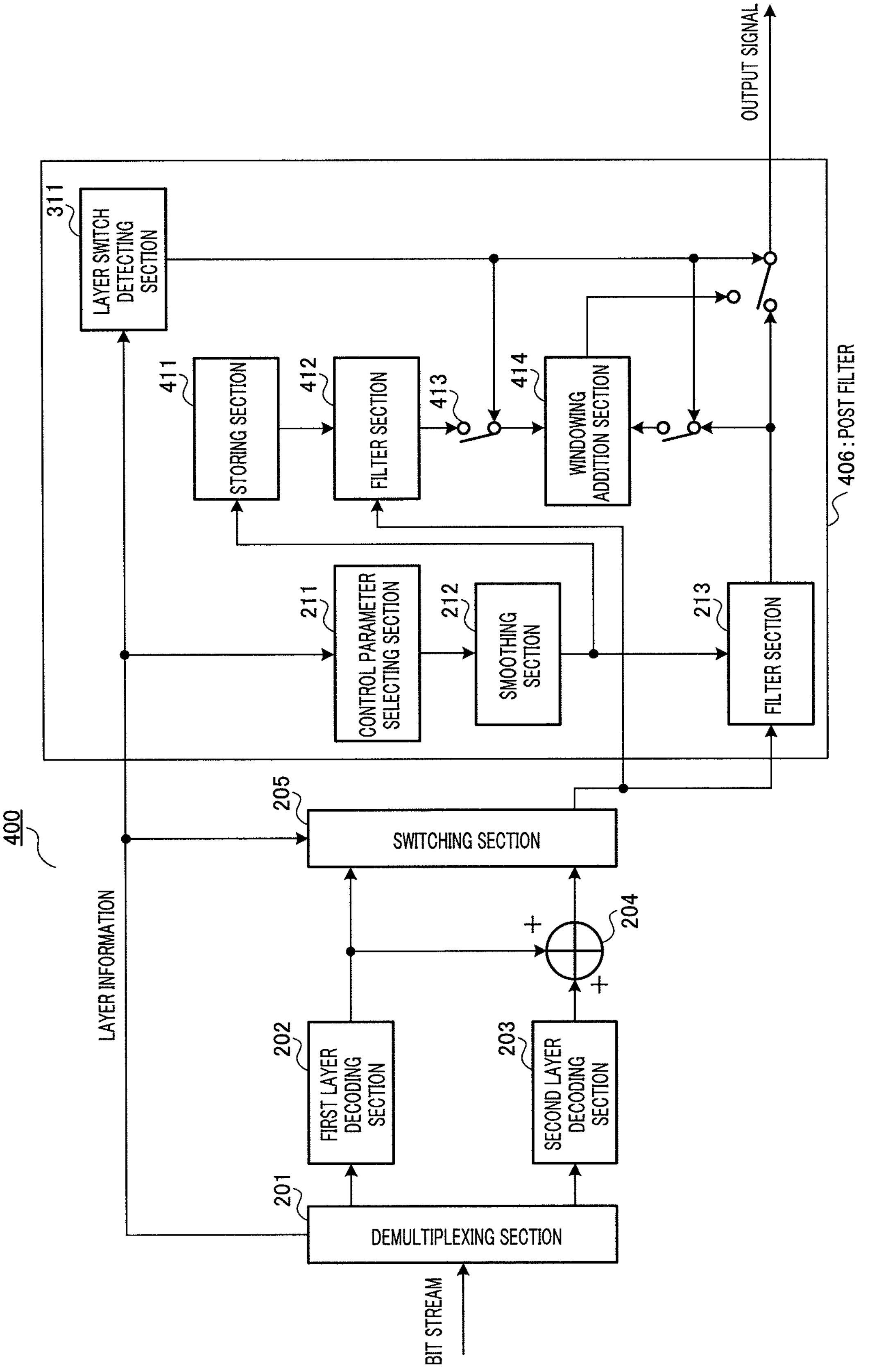
FIG. 12 is a block diagram showing the main configuration of the decoding apparatus according to Embodiment 3 of the present invention.

FIG. 12 is a block diagram showing the main configuration of the decoding apparatus according to Embodiment 3 of the present invention. Further, decoding apparatus 400 shown in FIG. 12 has the same basic configuration as decoding apparatus 200 shown in FIG. 2, and the same components will be assigned the same reference numerals and explanation thereof will be omitted.

The configuration inside post filter 406 of decoding apparatus 400 shown in FIG. 12 differs from post filter 206 of decoding apparatus 200 shown in FIG. 2, and post filter 406 has storing section 411, filter section 412, switch 413 and windowing addition section 414.

Storing section 411 stores smoothed control parameters used in an earlier frame. Further, after processing of the current frame is finished, content of storing section 411 is updated by the smoothed control parameters of the current frame.

Filter section 412 performs filtering using the smoothed control parameters of an earlier frame stored in storing section 411 to generate a filter output signal based on the smoothed control parameters of an earlier frame, and outputs the filter output signal to switch 413.

Switch 413 connects or disconnects filter section 412 and windowing addition section 414 according to detection information received from layer switch detection section 311. When detection information shows "1," switch 413 is turned on to connect filter section 412 and windowing addition section 414. When detection information shows "0," switch 413 is turned off to disconnect filter section 412 and windowing addition section 414.

When switch 413 is turned on, windowing addition section 414 performs windowing addition of the filter output signal of an earlier frame received from filter section 412 and the filter output signal of the current frame received from filter section 213, and outputs the windowing addition result as an output signal. To be more specific, windowing addition section 414 multiplies the filter output signal of an earlier frame with a window function that decreases gradually in the time domain, and multiplies the filter output signal of the current frame with a window function that increases gradually in the time domain. For example, when the frame length assumes $N_{FL}$, the triangular window as shown in following equation 13 is used.

[13]

$$y_{pf}(n) = \frac{N_{FL} - n}{N_{FL}} y_{pf\_prv}(n) + \frac{n}{N_{FL}} y_{pf\_cur}(n) \quad \text{(Equation 13)}$$

Here, $y_{pf}(n)$ is the output signal, $Y_{pf\_prv}(n)$ is the filter output signal based on the smoothed control parameter of an earlier frame and $y_{pf\_cur}(n)$ is the filter output signal based on the smoothed control parameter of the current frame. Further, a sine window or trapezoidal window may be used instead of a triangular window.

In this way, when layer switching takes place, the present embodiment performs windowing addition of a post filter output signal based on the smoothed control parameter used in an earlier frame and a post filter output signal based on the smoothed control parameter of the current frame to use two different smoothing processing with respect to output signals of the post filter, so that it is possible to further prevent occurrence of degraded sound.

Embodiment 4

Figure 13:
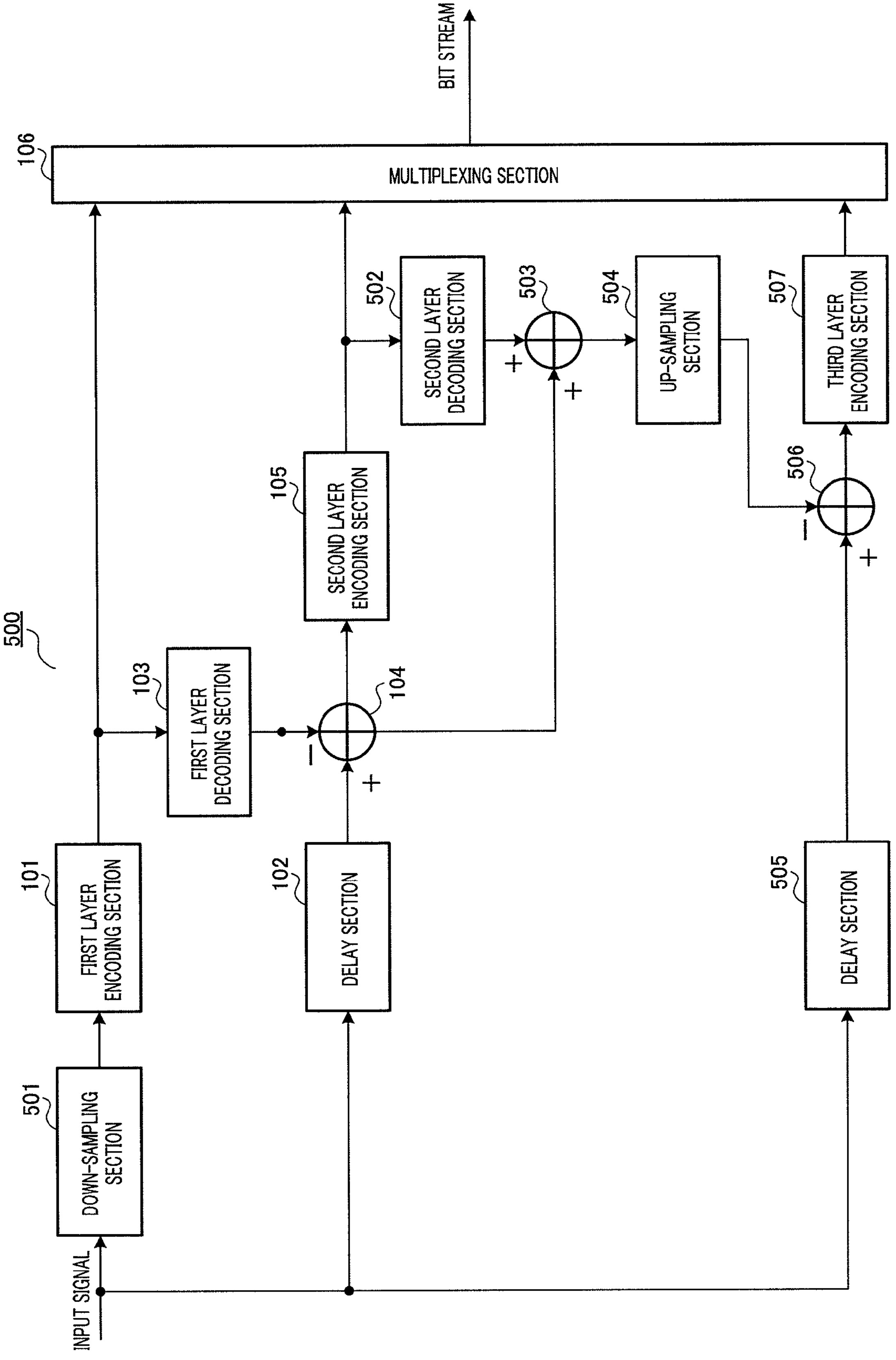
FIG. 13 is a block diagram showing the main configuration of the encoding apparatus that transmits encoded data to the decoding apparatus according to Embodiment 4 of the present invention.

FIG. 13 is a block diagram showing the main configuration of the encoding apparatus that transmits encoded data to the decoding apparatus according to Embodiment 4 of the present invention. Further, encoding apparatus 500 shown in FIG. 13 performs three-layer coding with respect to an input signal and employs the same basic configuration as encoding apparatus 100 shown in FIG. 1 with an addition of one layer, and the same components will be assigned the same reference numerals and explanation thereof will be omitted. Furthermore, with the present embodiment, the bandwidth of the input signal is FH, and the bandwidth of a signal which is the target to be encoded by the first layer encoding section and the second layer encoding section, is FL (FL<FH).

Compared to encoding apparatus 100 shown in FIG. 1, encoding apparatus 500 shown in FIG. 13 employs a configuration with additions of down-sampling section 501, second layer decoding section 502, adding section 503, up-sampling section 504, delay section 505, subtracting section 506, and third layer encoding section 507.

Down-sampling section 501 down-samples and converts a time domain input signal into a desired sampling rate.

Second layer decoding section 502 decodes second layer encoded data received from second layer encoding section 105 to generate a first layer decoded error signal, and outputs the first layer decoded error signal to adding section 503.

Adding section 503 adds the first layer decoded signal and the first layer decoded error signal to generate a second layer decoded signal, and outputs the second layer decoded signal to up-sampling section 504.

Up-sampling section 504 converts the sampling rate of the second layer decoded signal into the same sampling rate as the input signal, and outputs the result to subtracting section 506.

Delay section 505 delays the input signal by a predetermined time length, and outputs the input signal to subtracting section 506. The predetermined time length assumes the same duration as the delay time produced in down-sampling section 501, first layer encoding section 101, first layer decoding section 103, second layer encoding section 105, second layer decoding section 502 and up-sampling section 504.

Subtracting section 506 subtracts the second layer decoded signal received from up-sampling section 504, from the delayed input signal received from delay section 505, to generate a second layer error signal, and outputs the second layer error signal to third layer encoding section 507.

Third layer encoding section 507 encodes the input second layer error signal to generate third layer encoded data, and outputs the third layer encoded data to multiplexing section 106.

Multiplexing section 106 multiplexes the first layer encoded data, second layer encoded data and third layer encoded data to generate a bit stream, and outputs this bit stream.

Figure 14:
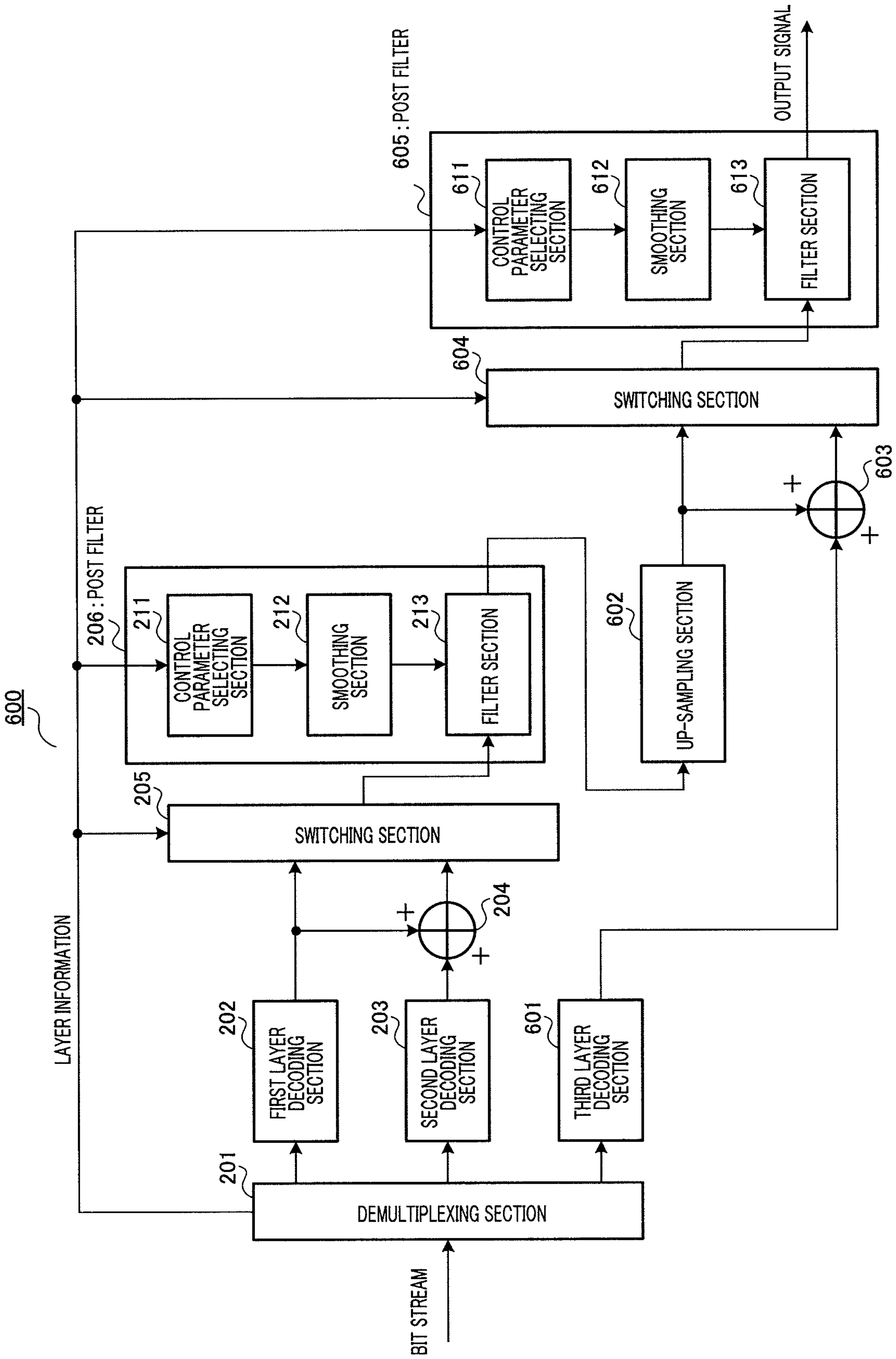
FIG. 14 is a block diagram showing the main configuration of the decoding apparatus according to Embodiment 4 of the present invention.

FIG. 14 is a block diagram showing the main configuration of the decoding apparatus according to Embodiment 4. Further, decoding apparatus 600 shown in FIG. 14 performs three-layer decoding with respect to the bit stream and employs the same basic configuration as decoding apparatus 200 shown in FIG. 2 with an addition of one layer, and, therefore, the same components will be assigned the same reference numerals and explanation thereof will be omitted.

Compared to decoding apparatus 200 shown in FIG. 2, decoding apparatus 600 shown in FIG. 14 employs a configuration with additions of third layer decoding section 601, up-sampling section 602, adding section 603, switching section 604 and post filter 605.

Figure 15:
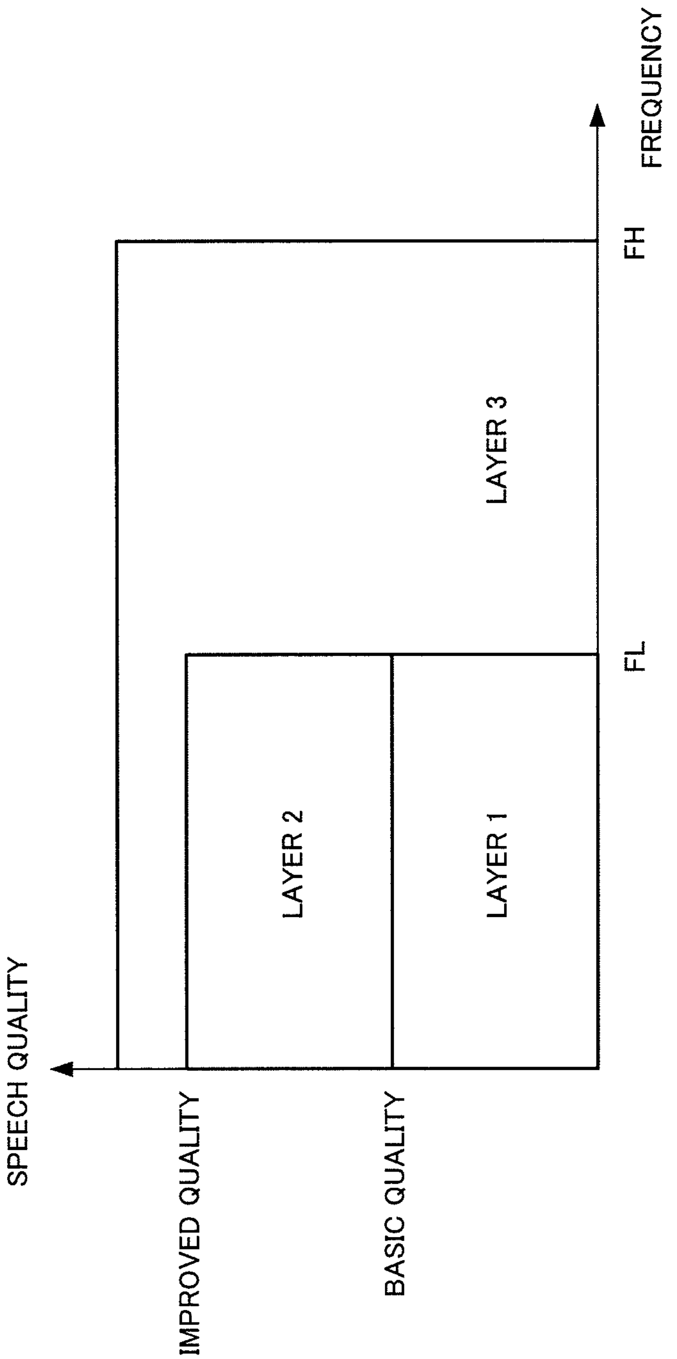
FIG. 15 shows distribution of encoded data in each layer in the frequency domain according to Embodiment 4 of the present invention.

Further, with the present embodiment, there is the relationship between each layer and the bandwidth of a decoded signal as shown in FIG. 15, and a decoded signal in the bandwidth FH is generated when encoded data of all layers (the first to third layers) is included in a bit stream, and a decoded signal in the bandwidth FL is generated when the third layer encoded data is not included in the bit stream.

Demultiplexing section 201 demultiplexes encoded data included in the bit stream to three items of data, and outputs the first layer encoded data, second layer encoded data and third layer encoded data to first layer decoding section 202, second layer decoding section 203 and third layer decoding section 601, respectively. Further, demultiplexing section 201 outputs layer information "1" when only the first layer encoded data is included, layer information "2" when the first layer encoded data and second layer encoded data are included and layer information "3" when encoded data of all layers (the first to third layers), to switching section 205 and post filter 206. Still further, although there are cases where all encoded data is discarded, in such cases, the decoding section of each layer performs predetermined error compensation processing and the post filter performs processing assuming that layer information shows "1." The present embodiment will be explained assuming that the decoding apparatus acquires either all encoded data, encoded data from which third layer encoded data is discarded, or encoded data from which third layer encoded data and second layer encoded data are discarded.

Post filter 206 performs the same filtering processing as in Embodiment 1, and outputs the filter output signal to up-sampling section 602.

Up-sampling section 602 makes the sampling rate of the filter output signal received from post filter 206, the same as the sampling rate of the input signal, and outputs the result to switching section 604 and adding section 603.

Third layer decoding section 601 performs decoding processing using the third layer encoded data to generate a second layer decoded error signal, and outputs the second layer decoded error signal to adding section 603.

Adding section 603 adds the up-sampled second layer decoded signal and the second layer decoded error signal to generate a third layer decoded signal, and outputs the third layer decoded signal to switching section 604.

Switching section 604 switches the decoded signal to output, based on layer information from demultiplexing section 201. To be more specific, switching section 604 outputs either the up-sampled first layer decoded signal or second layer decoded signal received from up-sampling section 602, as a decoded signal to post filter 605 when layer information shows either "1" or "2," and outputs the third layer decoded signal received from adding section 603, as a decoded signal to post filter 605 when layer information shows "3."

Further, post filter 605 performs the same processing as post filter 206, and detailed explanation thereof will be omitted. However, post filter 206 is designed to improve speech quality with respect to signals in the bandwidth FL, and post filter 605 is designed to improve speech quality with respect to signals in the bandwidth FH. Consequently, one of post filters 206 and 605 is applied such that post filter 206 is applied to decoded signals in the bandwidth FL or post filter 605 is applied to decoded signals in the bandwidth FH. This is because, when both post filters are applied at the same time, the spectrum is modified too much and speech quality deteriorates by contrast.

Consequently, when third layer encoded data is not included in the bit stream, that is, when the practical bandwidth of an output signal is FL, bandwidth FL post filter 206 executes post-filtering. At this time, control parameter selecting section 611 of bandwidth FH post filter 605 selects the non-modifying post filter, so that post filter 605 does not modify spectra.

Further, when third layer encoded data is included in a bit stream, that is, when the practical bandwidth of an output signal is FH, bandwidth FH post filter 605 executes post filtering. At this time, control parameter selecting section 211 of bandwidth FL post filter 206 selects the non-modifying post filter, so that post filter 206 does not modify spectra.

In this way, according to the present embodiment, even when layer switching takes place, smoothing is performed such that control parameters change gradually and, consequently, post filter characteristics do not change significantly between adjacent frames, so that it is possible to prevent occurrence of degraded sound. Further, even when an effective bandwidth varies between layers that perform encoding, it is possible to improve speech quality of each bandwidth by using the post filter of the present invention.

The frequency domain transforming section in the above embodiments is implemented by the FFT, DFT (Discrete Fourier Transform), DCT (Discrete Cosine Transform), MDCT (Modified Discrete Cosine Transform), subband filtering and so on.

Still further, although the above embodiments assume speech signals as decoded signals, the present invention is not limited to this and decoded signals may be, for example, audio signals.

Also, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2007-053528, filed on Mar. 2, 2007, including the specification, drawings and abstract, is incorporated herein by reference in its entirety.

INDUSTRIAL APPLICABILITY

The post filter, decoding apparatus and post filter method according to the present invention make it possible to suppress occurrence of degraded sound even when layer switching takes place, and are applicable to, for example, a speech decoding apparatus.

The invention claimed is:

1. A post filter that comprises a zero filter and a pole filter and suppresses quantization noise of a decoded speech signal which is subjected to layer coding by a coding scheme comprised of a plurality of layers, the post filter comprising:

a buffer that stores a predetermined value as a default value of a first control parameter;

a control parameter selector that, based on layer information showing layers included in a speech signal subjected to the layer coding, selects a second control parameter corresponding to the layer information;

a detector that detects switching of the layers;

a smoother that sets a smoothed control parameter to be used for filtering processing such that, when the detector detects the switching of the layers, the smoothed control parameter shifts in a multistep fashion from the first control parameter stored in the buffer to the second control parameter selected by the control parameter selector, and updates the buffer by the smoothed control parameter; and a first filtering processor that performs the filtering processing with respect to the decoded speech signal using the smoothed control parameter set by the smoother.

2. The post filter according to claim 1, wherein the first filtering processor performs the filtering processing with respect to the decoded speech signal of at least one layer, using a filter which is constituted by a zero filter and a pole filter comprising a same control parameter value and which does not modify a spectrum.

3. The post filter according to claim 2, wherein the same control parameter value of the zero filter and the pole filter constituting the filter which does not modify the spectrum, is made a value included in a range of control parameters of a second zero filter and a second pole filter constituting a second filter.

4. The post filter according to claim 1, further comprising:

a layer information controller that, when the detector detects the switching of the layers, changes the layer information such that the second control parameter does not change within a predetermined period.

5. The post filter according to claim 1, wherein the first filtering processor performs the filtering processing with respect to the decoded speech signal using the smoothed control parameter set in the smoother to generate a first filter output signal, and the first filtering processor further comprises:

a second filtering processor that performs filtering processing with respect to the decoded speech signal using a second smoothed control parameter set in the smoother previously to generate a second filter output signal; and a windowing adder that, when the detector detects the switching of the layers, performs windowing addition of the first filter output signal and the second filter output signal.

6. The post filter according to claim 1, wherein the smoother shifts the smoothed control parameter in each of a predetermined number of frames in the decoded speech signal.

7. The post filter according to claim 1, wherein a frame in the decoded speech signal is divided into a plurality of subframes and the smoother shifts the smoothed control parameter in each of the plurality of subframes.

8. The post filter according to claim 1, further comprising:

a layer information determiner that replaces the second control parameter corresponding to the layer information when a layer switching interval is less than a predetermined number of frames for suppressing shifting of the smoothed control parameter.

9. A decoding apparatus that decodes a speech signal which is subjected to layer coding by a coding scheme comprised of a plurality of layers, the decoding apparatus comprising:

a first layer decoder that performs first decoding processing with respect to first layer encoded data to generate a first layer decoded signal;

a second layer decoder that performs second decoding processing with respect to second layer encoded data to generate a first layer decoded error signal;

an adder that adds the first layer decoded signal and the first layer decoded error signal to generate a second layer decoded signal;

a switch that, based on layer information showing layers included in the speech signal subjected to the layer coding, switches and outputs the first layer decoded signal and the second layer decoded signal; and a post filter that comprises a zero filter and a pole filter and performs filtering processing with respect to a decoded signal received from the switch, wherein the post filter comprises:

a buffer that stores a predetermined value as a default value of a first control parameter;

a control parameter selector that, based on the layer information showing the layers included in the speech signal subjected to the layer coding, selects a second control parameter corresponding to the layer information;

a smoother that sets a smoothed control parameter to be used for filtering processing such that the smoothed control parameter shifts in a multistep fashion from the first control parameter stored in the buffer to the second control parameter selected by the control parameter selector, and updates the buffer by the smoothed control parameter; and a filtering processor that performs the filtering processing with respect to the decoded speech signal using the smoothed control parameter set by the smoother.

10. The decoding apparatus according to claim 9, wherein the filtering processor performs the filtering processing with respect to the decoded speech signal of at least one layer, using a filter which is constituted by a zero filter and a pole filter comprising a same control parameter value and which does not modify a spectrum.

11. The decoding apparatus according to claim 10, wherein the same control parameter value of the zero filter and the pole filter constituting the filter which does not modify the spectrum, is made a value included in a range of control parameters of a second zero filter and a second pole filter constituting a second filter.

12. The decoding apparatus according to claim 9, wherein the post filter further comprises:

a detector that detects switching of the layers; and a layer information controller that changes the layer information such that the second control parameter does not change within a predetermined period when the detector detects the switching of the layers.

13. The decoding apparatus according to claim 9, wherein the filtering processor performs the filtering processing with respect to the decoded speech signal using the smoothed control parameter set in the smoother to generate a first filter output signal, and the filtering processor further comprises:

a detector that detects switching of the layers;

a second filtering processor that performs filtering processing with respect to the decoded speech signal using a second smoothed control parameter set in the smoother previously to generate a second filter output signal; and a windowing adder that, when the detector detects the switching of the layers, performs windowing addition of the first filter output signal and the second filter output signal.

14. The decoding apparatus according to claim 9, wherein the smoother shifts the smoothed control parameter in each of a predetermined number of frames in the decoded speech signal.

15. The decoding apparatus according to claim 9, wherein a frame in the decoded speech signal is divided into a plurality of subframes and the smoother shifts the smoothed control parameter in each of the plurality of subframes.

16. The decoding apparatus according to claim 9, wherein the post filter further comprises:

a layer information determiner that replaces the second control parameter corresponding to the layer information when a layer switching interval is less than a predetermined number of frames for suppressing shifting of the smoothed control parameter.

17. A post filtering processing method of suppressing quantization noise of a decoded speech signal which is subjected to layer coding by a coding scheme comprised of a plurality of layers, the post filtering processing method comprising:

selecting, based on layer information showing layers included in a speech signal subjected to the layer coding, a selected control parameter corresponding to the layer information;

storing a present control parameter in a buffer;

detecting switching of the layers;

setting a smoothed control parameter, according to an independent smoothing coefficient, to be used for filtering processing such that, when detecting the switching of the layers, the smoothed control parameter shifts in a multistep fashion from the present control parameter to the selected control parameter, and updates the buffer by the smoothed control parameter; and performing the filtering processing with respect to the decoded speech signal using the set smoothed control parameter.

18. The post filtering processing method according to claim 17, wherein the smoothed control parameter is set to shift in each of a predetermined number of frames in the decoded speech signal.

19. The post filtering processing method according to claim 17, further comprising:

dividing a frame in the decoded speech signal into a plurality of subframes, wherein the smoothed control parameter is set to shift in each of the plurality of subframes.

20. The post filtering processing method according to claim 17, further comprising:

replacing the second control parameter corresponding to the layer information when a layer switching interval is less than a predetermined number of frames for suppressing switching of the smoothed control parameter.

* * * * *